(12) United States Patent
Oblak et al.

(10) Patent No.: US 8,651,779 B2
(45) Date of Patent: Feb. 18, 2014

(54) PROCESS FOR PRODUCING A DRIVE SHAFT

(75) Inventors: Aleksander Oblak, Recica ob Savinji (SI); Jurij Pesec, Slowenien (SI); Roman Sabec, Smartno (SI)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 973 days.

(21) Appl. No.: 12/673,169

(22) PCT Filed: Jul. 30, 2008

(86) PCT No.: PCT/EP2008/059977
§ 371 (c)(1),
(2), (4) Date: Feb. 12, 2010

(87) PCT Pub. No.: WO2009/021843
PCT Pub. Date: Feb. 19, 2009

(65) Prior Publication Data
US 2011/0200405 A1  Aug. 18, 2011

(30) Foreign Application Priority Data
Aug. 14, 2007 (DE) .......................... 10 2007 038 370

(51) Int. Cl.
*B23F 15/06* (2006.01)
*B23F 17/00* (2006.01)

(52) U.S. Cl.
USPC .................. 409/51; 409/38; 409/52; 409/57; 29/893.1; 29/593.35; 29/558

(58) Field of Classification Search
USPC .............. 409/38, 50, 51, 52, 56, 57, 61, 165, 409/131–132; 29/893.1, 893.3, 893.35, 558
See application file for complete search history.

(56) References Cited

U.S. PATENT DOCUMENTS 1,905,277 A * 4/1933 Ewert .............................. 409/12
2,164,643 A * 7/1939 Drader ............................ 409/12
(Continued)

FOREIGN PATENT DOCUMENTS

AU 1368570 10/1971
BE 403622 7/1934
(Continued)

OTHER PUBLICATIONS

Machine Translation of DE 3006645 A1, which DE '645 was published Sep. 1981.*

*Primary Examiner* — Erica E Cadugan
(74) *Attorney, Agent, or Firm* — James E. Howard; Andre Pallapies

(57) ABSTRACT

A method for producing a drive shaft of a food processor, the drive shaft having an end-side, splined-shaft-like toothing that is movable into positively locking engagement with a complementarily formed clutch. The method includes producing the toothing by machining the drive shaft with a cylindrical milling cutter, wherein the cylindrical milling cutter engages with the drive shaft from a radial direction with respect to a longitudinal axis of the drive shaft; and positioning an axis of rotation of the cylindrical milling cutter crosswise relative to the longitudinal axis of the drive shaft, wherein the axis of rotation of the cylindrical milling cutter is at an incline relative to the longitudinal axis of the drive shaft so that the axis of rotation and the longitudinal axis draw an angle of less than 90°.

20 Claims, 3 Drawing Sheets

(56) References Cited

U.S. PATENT DOCUMENTS

| | | | |
|---|---|---|---|
| 2,384,800 A | 9/1945 | Cox | |
| 2,941,287 A | 6/1960 | Cork | |
| 3,301,135 A | 1/1967 | Jenkins | |
| 4,164,891 A | 8/1979 | Lieser | |
| 6,394,718 B1 * | 5/2002 | Doerfel | 409/132 |

FOREIGN PATENT DOCUMENTS

| | | | |
|---|---|---|---|
| DE | 189585 | | 10/1907 |
| DE | 1775455 | | 10/1958 |
| DE | 3006645 | A1 | 9/1981 |
| DE | 3532038 | C1 | 3/1987 |
| DE | 4132487 | A1 * | 4/1993 |
| DE | 10318408 | A1 | 11/2004 |
| FR | 1131064 | | 2/1957 |
| FR | 2820021 | A1 | 8/2002 |
| GB | 546689 | | 7/1942 |
| GB | 1326600 | | 8/1973 |
| JP | 2-83108 | A | 3/1990 |
| JP | 2005-22058 | A | 1/2005 |
| WO | 2007051222 | A1 | 5/2007 |

\* cited by examiner

PROCESS FOR PRODUCING A DRIVE SHAFT

BACKGROUND OF THE INVENTION

The invention relates to a method for producing a shaft, in particular the drive shaft of a food processor, having an end-side, splined-shaft-like toothing, which can be moved into positively locking engagement with a complementarily formed clutch, the toothing being produced by machining the drive shaft by means of a milling cutter, and a food processor with a clutch, into which a shaft, preferably a drive shaft, provided with a splined-shaft-like toothing can be moved into positively locking engagement.

A generic food processor is described in the publication DE 35 32 038 C2. The aforementioned food processor has a vertical drive shaft, which is actively connected to an electrical drive on its lower end. The upper end of the drive shaft is equipped with a splined-shaft-like toothing, onto which the complementarily formed clutch of a disk-type tool can be placed.

It is known from practice to produce the toothing of such shafts by machining said shaft. To this end, a cylindrical milling cutter is guided through the material of the shaft, with the radial surface thereof moving along a cladding of the toothing and the axial surface thereof moving along the bordering cladding of the toothing. Here the axis of rotation of the milling cutter is at right angles relative to a cladding to be machined, parallel relative to the other cladding and offset in relative to the longitudinal axis of the shaft, so that one cladding is formed on the front panel and the other is formed on the peripheral surface of the milling cutter. Minimal shifts in the axis of rotation of the milling cutter relative to the longitudinal axis of the shaft, in particular as a result of the unfavorable force transmission from the milling cutter into the shaft, in this case result in considerably non-symmetrical form deviations of the toothing. When subsequently inserting the shaft into the clutch, which is embodied for simple insertion usually with a significant allowance for interference, such toothings tend to shift the longitudinal axis of the shaft relative to the longitudinal axis of the clutch from a coaxial alignment, thereby possibly resulting in vibrations and an irregular operation when using the food processor.

The Australian patent specification AU 13,685/70 discloses a device and a method for producing screw driver inserts. Notches are inserted into the component part here by means of disk-type milling cutters which engage peripherally with the component part. The milling cutter axis runs at right angles to the longitudinal axis of the component part, but does however not cross the same. Conceptually similar devices and methods are known from US patent specification U.S. Pat. No. 3,301,135 and U.S. Pat. No. 2,384,800 and from the Belgian patent specification BE 403 622, the international patent application WO 2007/051222 A1 and the German patent specification DE 189 585. The English Abstract (patent abstracts of Japan) JP 2005-22058 A discloses a method, in which a notch is inserted into a component part with a cylindrical cutter.

The French patent application FR 1 131 064 A discloses a device for introducing grooves into a component part, wherefore two slotting end mills are provided, the axes of which are at right angles to the longitudinal axis of the component part and cross the same and radially engage with the component part.

The British patent specification GB 546,689 discloses, how V-shaped, U-shaped or other notches can be produced using conical, cylindrical or otherwise formed end mill cutters, if the milling cutter engages at right angles with the component part.

BRIEF SUMMARY OF THE INVENTION

The object underlying the invention is to provide an improved method for producing a shaft, in particular for a food processor, and an improved food processor. When operating the shaft produced with the improved method and the improved food processor, a low-vibration and smooth operation is also to be set up without purposely adjusting the clutch.

As a result of the milling cutter, relative to the longitudinal axis of the shaft, essentially engaging with the shaft (1) from a radial direction, the force transmission in the shaft takes place more symmetrically in respect of the toothing flanks to be embodied here. The invention enables the shaft to have less of a tendency to move asymmetrically relative to the milling cutter. Similarly, form tolerances in the toothing drop out less in the case of possible positional deviations of the milling cutter.

Advantageous embodiments and developments, which can be used individually or in combination with one another, form the subject matter of the dependent claims.

In a preferred embodiment of the invention, the axis of rotation of the milling cutter is aligned at an incline relative to the machined claddings of the toothing. When implementing the method according to the invention, the axis of rotation of the milling cutter is advantageously inclined relative to the radial extension of the machined claddings of the toothing, which essentially corresponds to half the opening angle of the toothing. With a cross-wise toothing with toothing claddings arranged at right angles to one another, the angle of inclination of the milling cutter therefore preferably amounts to 45°.

According to an alternative method, the axis of rotation of the milling cutter is positioned cross-wise relative to the longitudinal axis of the shaft. In a preferred variant of this method, the axis of rotation of the milling cutter is aligned orthogonally relative to the longitudinal axis of the shaft. The slotting end mill preferably used here tapers at its free end, with it being possible to embody the apex to be rounded. In another variant of the method as illustrated in FIG. 9, the longitudinal axis of the milling cutter is at an incline relative to the longitudinal axis of the shaft such that the two axes draw an angle of less than 90°, preferably between 15° and 75°, particularly preferably between 30° and 60°, particularly preferably essentially 45°. In this method variant, the milling cutter is preferably a cylindrical milling cutter. The cross-section of the groove is essentially elliptical and is determined by the angle of inclination of the axes relative to one another and the diameter of the milling cutter.

In a preferred embodiment of the inventive method, the milling cutter is guided in the longitudinal direction of the shaft, so that it embodies a longitudinal groove in the peripheral surface of the shaft. By mounting several longitudinal grooves on the peripheral surface, the teeth of the toothing are created in the regions between the longitudinal grooves. A shaft with four longitudinal grooves is preferably provided, other inventive embodiments are however also conceivable, in particular the embodiment of 3 or 5 longitudinal grooves.

With the inventively embodied food processor, the profile of the toothing of the shaft and the complementary recess of the clutch are in particular embodied in an approximately cross-wise fashion. This toothing which is particularly easy to manufacture using the inventive method is also sufficiently robust for use within the kitchen and is insensitive to contamination.

The mechanical load and the cleaning behavior can be further improved by rounding the groove bottom of the toothing, with the radius of the groove bottom amounting for instance to 0.05 times to 0.2 times, particularly preferably approximately 0.125 times the outer diameter of the toothing. If the rounding of the groove bottom extends radially outwards, the tangents on the radially outer point of the claddings are understood within the meaning of the present invention as the alignment of the claddings.

The inner diameter forming the groove bottom advantageously amounts here to 0.5 times to 0.75 times, in particular 0.625 times the outer diameter of the toothing.

The structurally predetermined play between the toothing of the shaft and the recess of the clutch is also embodied in accordance with an advantageous embodiment of the invention such that the toothing of the shaft is aligned rotated by an angle of 15° to 20°, preferably approximately 17.5° along the shared longitudinal axis when transmitting a torque relative to the complementary recess of the clutch which is embodied with allowance for overhang. Aside from an additional self-centering of the shaft in the clutch, a slight joining is also effected in the case of contamination in the clutch area.

BRIEF DESCRIPTION OF THE DRAWINGS

The invention is described in more detail below in an exemplary embodiment with reference to schematic drawings, in which.

DETAILED DESCRIPTION OF EXEMPLARY EMBODIMENTS OF THE PRESENT INVENTION

Figure 1:
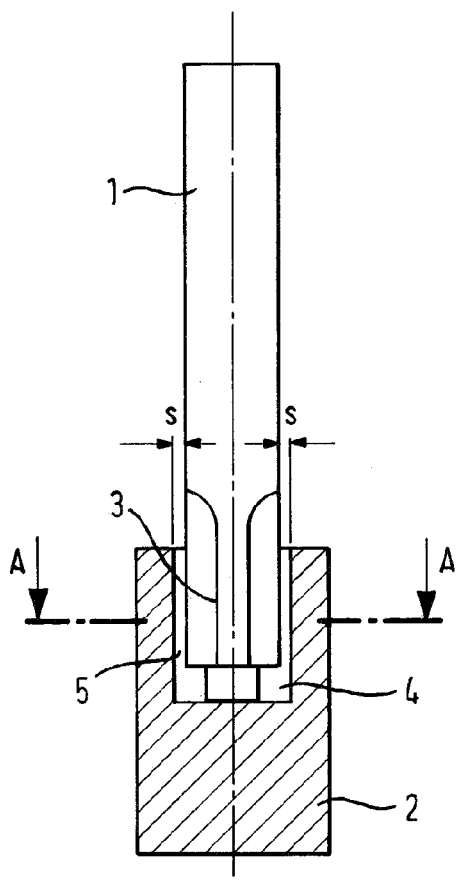
FIG. 1 shows a side view of an inventively configured clutch area with a longitudinally-cut clutch in the design position.

With the subsequent description of preferred embodiments of the present invention, the same reference characters refer to the same or comparable components.

Figure 2:
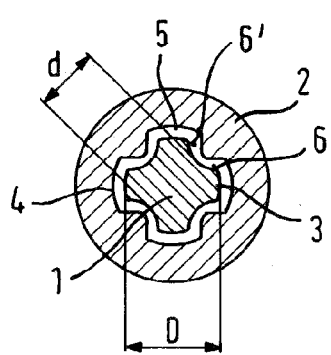
FIG. 2 shows a cross-section A-A through the clutch area shown in FIG. 1 in the design position

As apparent from FIGS. 1 and 2, the transmission of the drive torque to the shaft 1, which is actively connected to a tool (likewise not shown) takes place by a motor (not shown) of the food processor by way of a clutch 2. On its end which can be inserted into the clutch 2, the shaft 1 is provided with a cross-wise toothing 3 which extends in the longitudinal direction of the shaft, said toothing 3 being insertable into a complementary, nevertheless enlarged recess 4 of the clutch 2. In the design position of the clutch area, the shaft 1 is at a distance relative to the clutch 2 by means of an approximately equidistantly proceeding radial gap 5. With an outer diameter D of the shaft 1 of 12 mm for instance, the gap width s can amount to 1.5 mm for instance. The adjacent claddings 6, 6' of the toothing 3 are aligned approximately at right angles to one another and pass into one another in a largely rounded groove bottom 7.

Figure 5:
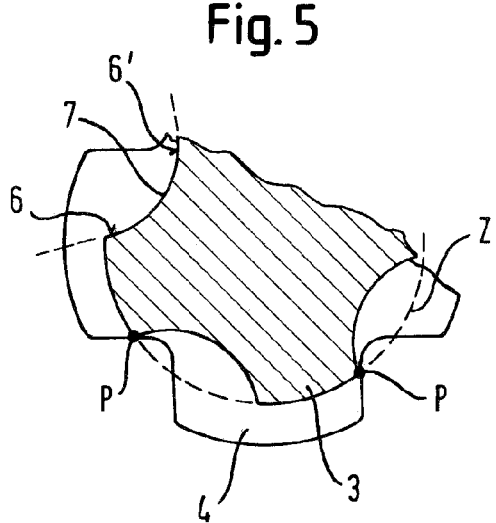
FIG. 5 shows an enlarged cutout of the representation according to FIG. 4.
Figure 3:
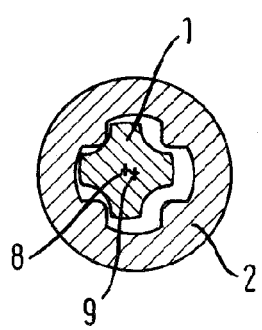
FIG. 3 shows the cross-section according to FIG. 2, immediately after joining the shaft to the clutch.
Figure 4:
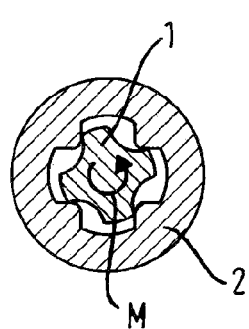
FIG. 4 shows the cross-section according to FIGS. 2 and 3 during the transmission of a torque.

When inserting the shaft 1 into the clutch 2, an eccentric alignment of the longitudinal axis 8 of the shaft 1 relative to the longitudinal axis 9 of the clutch 2 is generally set up (FIG. 3). On account of the radial gap 5 measured liberally in the design position, the joining is also possible without difficulty in the event of developing form or positional deviations of these components and in the event of the contamination thereof. When introducing a torque M into the shaft, a centering of the shaft 1 takes place immediately in the clutch 2, as shown in FIG. 4. The contact areas P between toothing 3, shaft 1 and recess 4 of the clutch 2 are then, as apparent from FIG. 5, arranged on an area of the cylindrical surface Z surrounding the longitudinal axis of the clutch 2.

Figure 6:
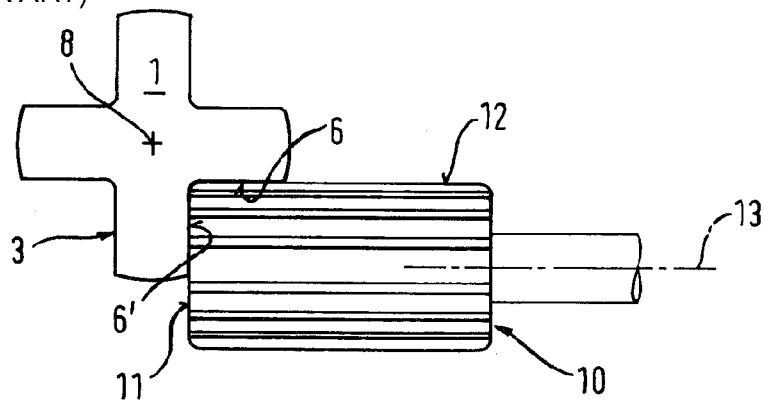
FIG. 6 shows the manufacture of a toothing according to the prior art.

In the case of the manufacture of toothings for drive shafts of food processor in accordance with the prior art, as shown in FIG. 6, a cylindrical milling cutter 10 is guided along the shaft 1 such that its front face 11 rests at least partially against the cladding 6' and areas of its peripheral surface 12 rest against the cladding 6. The axis of rotation 13 is offset here relative to the longitudinal axis 8 of the shaft 1 and is aligned parallel and/or at a right angle to the claddings 6, 6' and is moved in the longitudinal direction of the shaft. The finger-type milling cutter 10 has a tendency to deviate as a result of bending away from the desired milling position. A slight error in the alignment of the milling cutter 10 likewise results in a very asymmetrical embodiment of the toothing 3.

Figure 7:
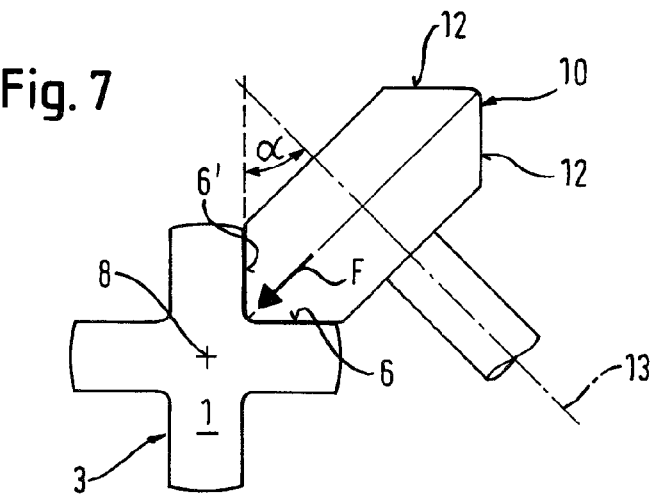
FIG. 7 shows a first inventive method for manufacturing the toothing.

By contrast, when implementing the inventive method, the axis of rotation 13 of the milling cutter 10 is guided at an incline relative to the claddings 6, 6', with the angle of inclination α, in the case of the toothings 3 shown in the exemplary embodiments, with right-angled claddings 6 and 6' amounting to 45°. As shown in FIG. 7, the milling cutter 10 can be embodied in the manner of a disk with a V-shaped peripheral surface 12, with the axis of rotation 13 being offset relative to the longitudinal axis 8 of the shaft 1 and being aligned outside the cross-section of the shaft 1, the force F exerted one the shaft 1 by the milling cutter 10 nevertheless proceeding in a defined fashion in the direction of the longitudinal axis 8.

Figure 8:
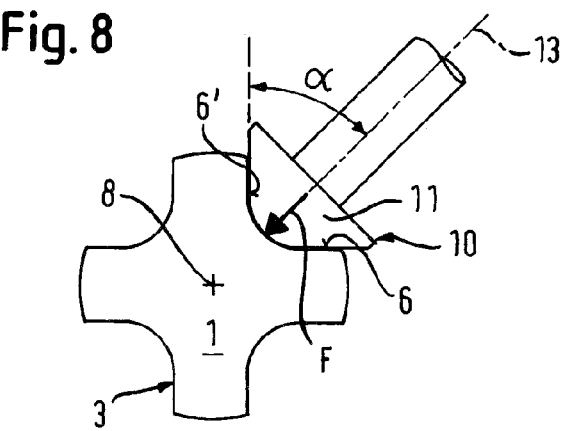
FIG. 8 shows a manufacturing method according to another embodiment of the invention.
Figure 9:
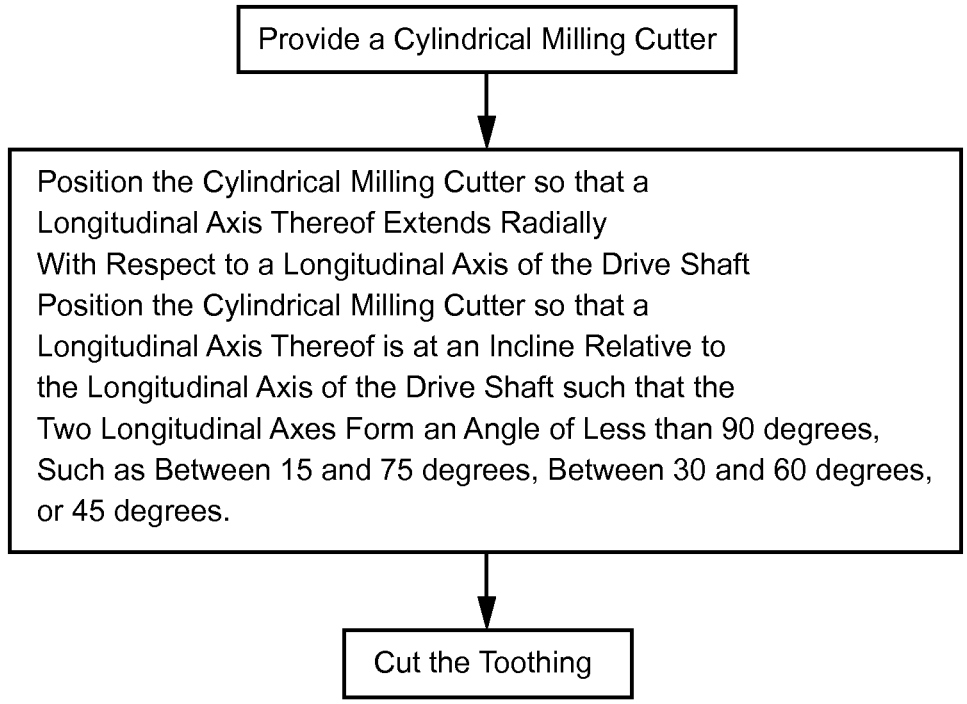
FIG. 9 shows a manufacturing method according to another embodiment of the invention.
Figure 10:
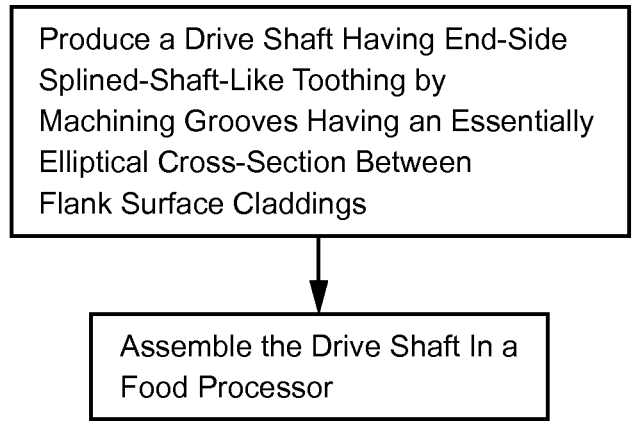
FIG. 10 shows a manufacturing method according to another embodiment of the invention.

Alternatively, a milling cutter 10 with a cone-shaped front face can be used during manufacture if the toothing 3 (FIG. 8), the axis of rotation 13 of which is likewise inclined by an angle α of 45° relative to the claddings 6, 6', but is nevertheless aligned in the direction of the longitudinal axis 8 of the shaft 1.

A more symmetrical toothing 3 of the shaft 1 can be easily created using the inventive method. The invention provides for a food processor which operates particularly smoothly and with little vibration.

The features disclosed in the preceding description, the claims and the drawings can be significant for the realization of the invention in its different embodiments both individually and also in any combination.

The invention claimed is:

1. A method for producing a drive shaft of a food processor, the drive shaft having an end-side, splined-shaft-like toothing that is movable into positively locking engagement with a complementarily formed clutch, the method comprising:
    producing the toothing by machining the drive shaft with a cylindrical milling cutter, wherein during the machining, a longitudinal axis of the cylindrical milling cutter extends in a radial direction with respect to a longitudinal axis of the drive shaft; and wherein, during the machining, the longitudinal axis of the cylindrical milling cutter is positioned cross-wise relative to the longitudinal axis of the drive shaft, such that the longitudinal axis of the cylindrical milling cutter is at an incline relative to the longitudinal axis of the drive shaft so that the longitudinal axis of the cylindrical milling cutter and the longitudinal axis of the drive shaft form an angle of less than 90°.

2. The method of claim 1, wherein the longitudinal axis of the cylindrical milling cutter is aligned at an incline relative to machined flank surface claddings of the toothing.

3. The method of claim 2, wherein the longitudinal axis of the cylindrical milling cutter is inclined by an angle relative to a surface of the machined claddings of the toothing that is half of the angle between two adjacent machined claddings.

4. The method of claim 1, wherein a groove formed by the cylindrical milling cutter between adjacent teeth of the toothing has a rounded cross section.

5. The method of claim 1, wherein the cylindrical end milling cutter is used to produce four teeth in the drive shaft.

6. The method of claim 1, wherein the cylindrical milling cutter, along the longitudinal axis thereof, comprises a supported end and a free end.

7. The method of claim 6, wherein the free end engages and cuts the drive shaft.

8. The method of claim 1, wherein during the producing of the toothing, the cylindrical milling cutter cuts a groove in the drive shaft that is essentially elliptical in cross-section.

9. The method of claim 8, wherein a shape of the elliptical cross-section is determined by the incline of the longitudinal axis of the cylindrical milling cutter relative to the longitudinal axis of the drive shaft, and by a diameter of the cylindrical milling cutter.

10. The method of claim 1, wherein the angle is between 15° and 75°.

11. The method of claim 1, wherein the angle is between 30° and 60°.

12. The method of claim 1, wherein the angle is 45°.

13. A method for producing a food processor with a drive shaft having an end-side, splined-shaft-like toothing that is movable into positively locking engagement with a complementarily formed clutch, the method comprising:

producing the drive shaft according to the method of claim 1;

and assembling the drive shaft in the food processor.

14. The method of claim 13, wherein during the machining, the cylindrical milling cutter cuts a groove in the drive shaft that has an essentially elliptical cross-section.

15. The method of claim 14, wherein a shape of the essentially elliptical cross-section is determined by the angle and a diameter of the cylindrical milling cutter.

16. The method of claim 13, wherein the cylindrical milling cutter is used to produce four teeth in the drive shaft.

17. The method of claim 13, wherein a free end of the cylindrical milling cutter removes material from the drive shaft during the machining.

18. The method of claim 13, wherein the angle is between 15° and 75°.

19. The method of claim 13, wherein the angle is between 30° and 60°.

20. The method of claim 13, wherein the angle is 45°.

* * * * *

UNITED STATES PATENT AND TRADEMARK OFFICE
CERTIFICATE OF CORRECTION

PATENT NO.         : 8,651,779 B2
APPLICATION NO.    : 12/673169
DATED              : February 18, 2014
INVENTOR(S)        : Oblak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1006 days.

Signed and Sealed this

Twenty-ninth Day of September, 2015

Michelle K. Lee
*Director of the United States Patent and Trademark Office*